(12) United States Patent
Park

(10) Patent No.: US 10,151,842 B2
(45) Date of Patent: *Dec. 11, 2018

(54) GOLF GPS DEVICE WITH APPROXIMATE HOLE CUP LOCATION SELECTION

(71) Applicant: DECA SYSTEM, INC., Seongnam-si, Gyeonggi-do (KR)

(72) Inventor: Jun Ha Park, Yongin-Si (KR)

(73) Assignee: GolfzonDeca Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,673

(22) Filed: Nov. 21, 2016

(65) Prior Publication Data
US 2017/0082752 A1    Mar. 23, 2017

Related U.S. Application Data

(63) Continuation of application No. 14/475,459, filed on Sep. 2, 2014, now Pat. No. 9,535,162.

(60) Provisional application No. 61/872,623, filed on Aug. 30, 2013.

(51) Int. Cl.
*G01S 19/19*    (2010.01)
*A63B 71/06*    (2006.01)
*A63B 57/00*    (2015.01)

(52) U.S. Cl.
CPC .............. *G01S 19/19* (2013.01); *A63B 57/00* (2013.01); *A63B 71/0619* (2013.01); *A63B 2071/0663* (2013.01); *A63B 2071/0691* (2013.01); *A63B 2220/12* (2013.01)

(58) Field of Classification Search
None
See application file for complete search history.

(56) References Cited

U.S. PATENT DOCUMENTS 6,456,938 B1    9/2002  Barnard
2008/0058125 A1*  3/2008  Nguyen ................ A63B 57/00
                                                        473/407

* cited by examiner

*Primary Examiner* — Mussa A Shaawat
*Assistant Examiner* — Kyung J Kim
(74) *Attorney, Agent, or Firm* — Knobbe Martens Olson & Bear LLP

(57) ABSTRACT

The disclosure herein provides a golf GPS device with a hole cup location selection mechanism which displays a plurality of selectable hole cup locations for selection by a user. When the user selects one of the plurality of selectable hole cup locations, the golf GPS device provides the user with a number representative of the distance between the user and the selected one of the plurality of selectable hole cup locations.

19 Claims, 18 Drawing Sheets

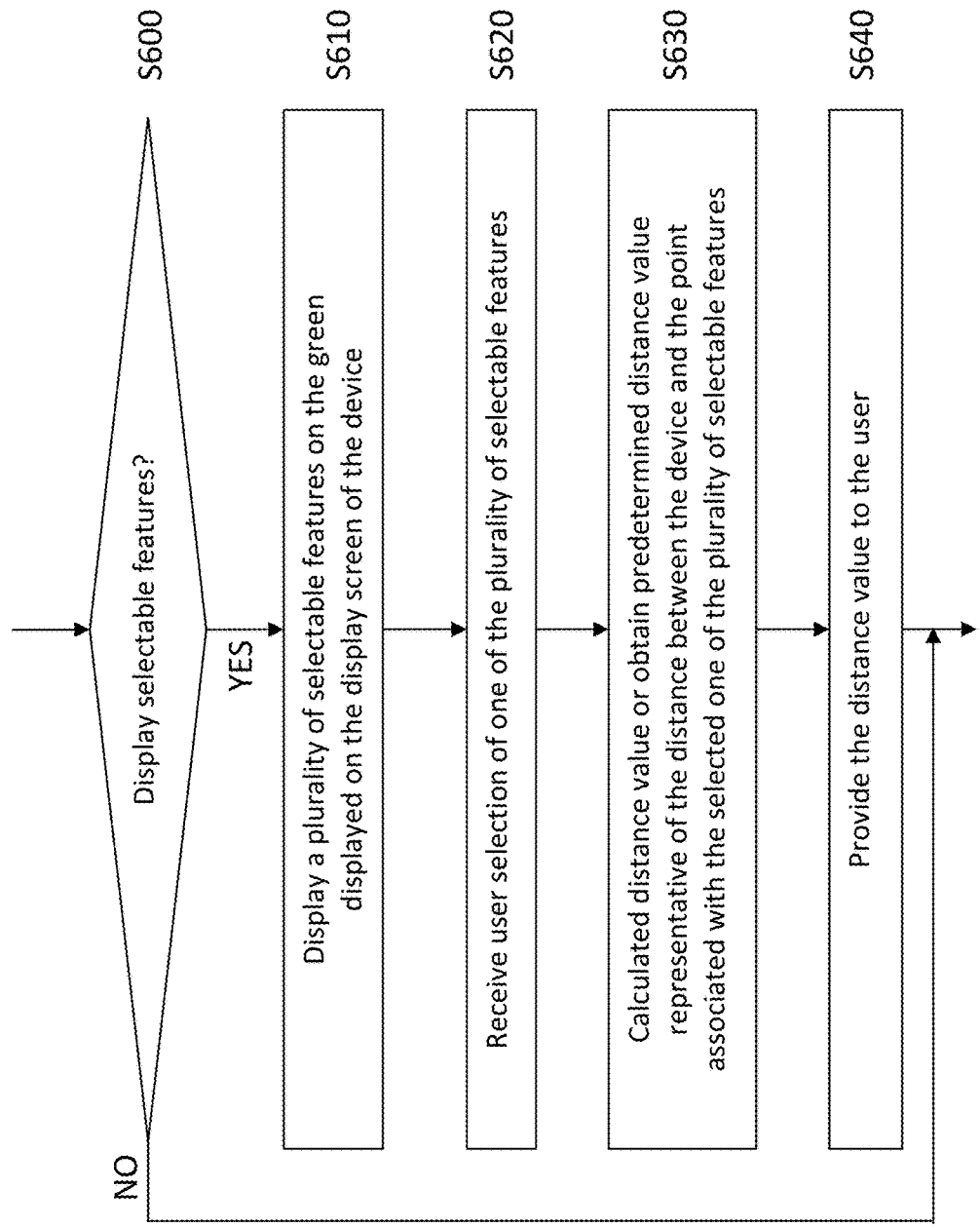

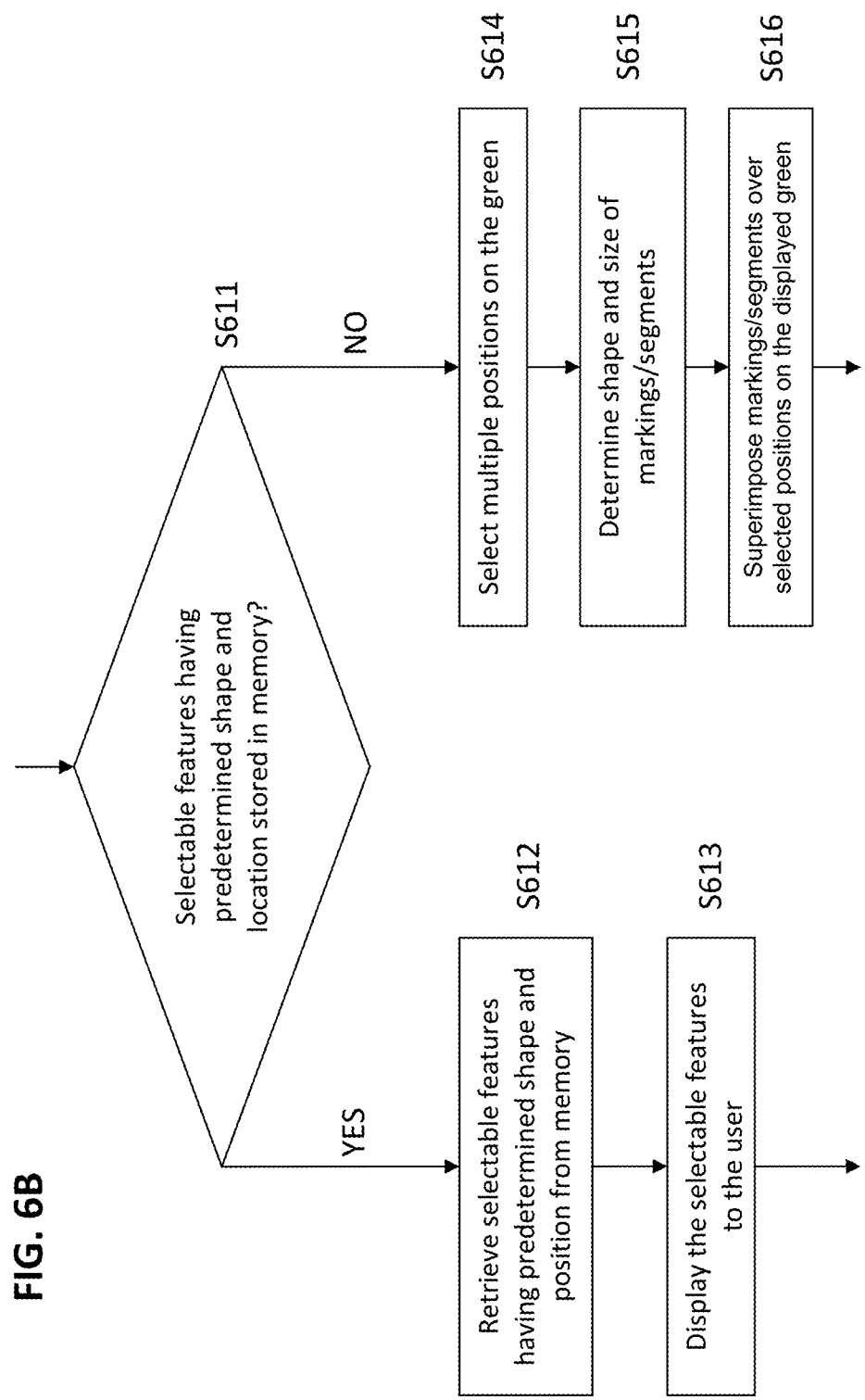

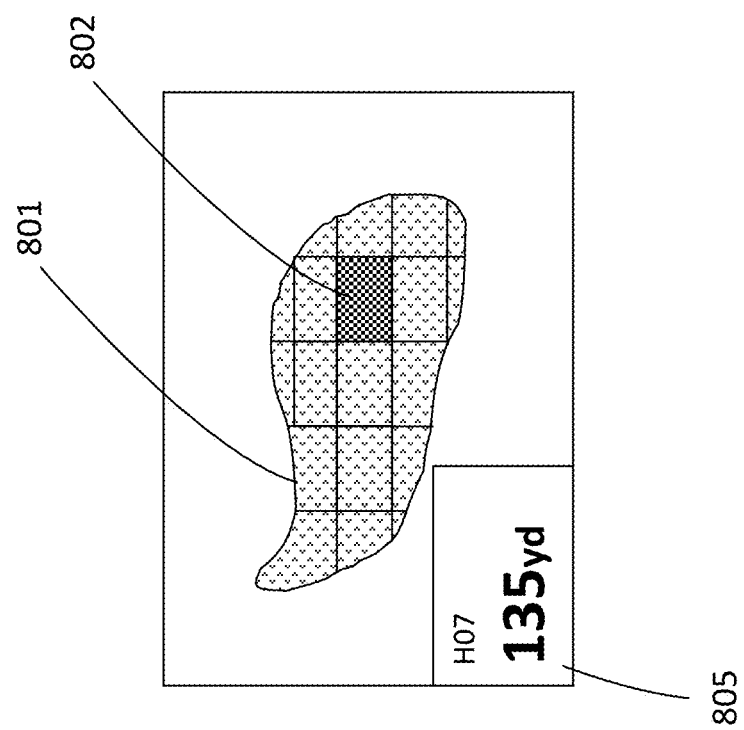

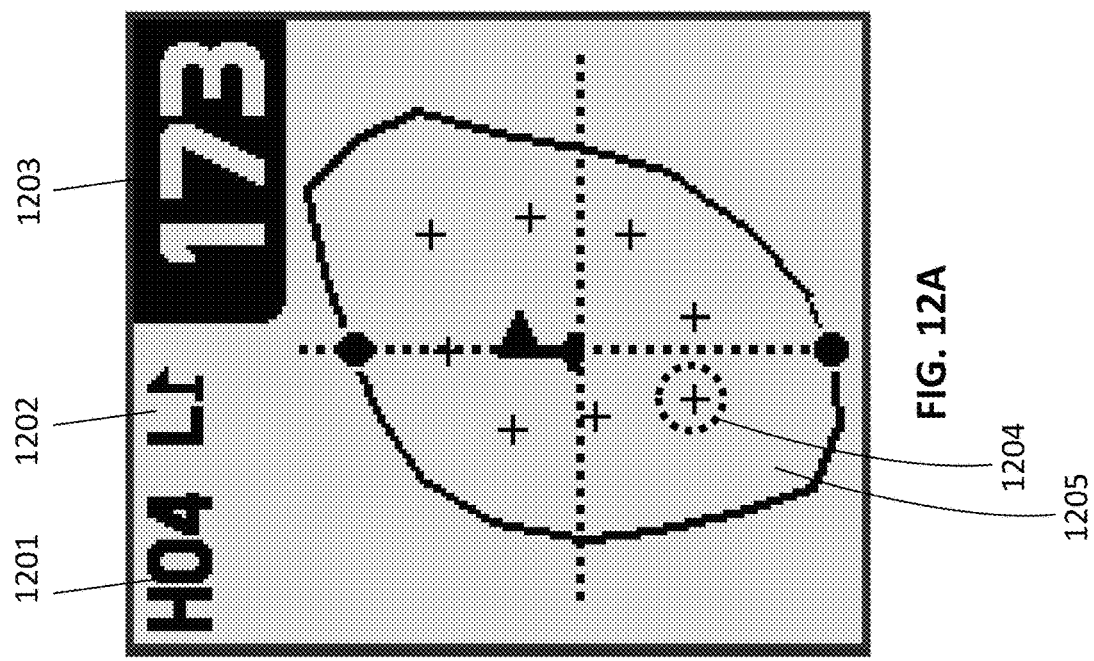

GOLF GPS DEVICE WITH APPROXIMATE HOLE CUP LOCATION SELECTION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to golf GPS devices.

Description of the Related Art

With the development of new technologies, GPS devices and systems can be employed to allow a golf player to track his or her location along a golf course. A golf GPS device can further be used to determine distances between the player and various points of interest along the golf course, such as the hole cup or the green.

SUMMARY

In one aspect, a golf GPS device comprises a display for displaying a golf course map including a green, wherein the green is displayed with a plurality of selectable features, each selectable feature being associated with a point on the green, wherein the device lets a user select one of the selectable features. When one of the selectable features is selected, the device may display the distance between the device and the point associated with the selected feature on the display.

In one aspect, the displayed green is partitioned into a plurality of segments, and each selectable feature represents one of the plurality of segments of the displayed green. The point associated with the segment is a position within the pre-segmented portion.

In one aspect, each selectable feature is represented by an icon placed on the displayed green. The point associated with the icon may be a position on the actual green corresponding to the location of the icon on the displayed green or the location indicated by the icon on the displayed green.

In one aspect, the device highlights one of the selectable features for immediate selection by the user. Upon the user's command, the device may dehighlight the immediately previously highlighted feature and highlight another one of the selectable features in a predetermined sequence. The display may be a non-touch screen.

In one aspect, the device comprises a GPS module configured to receive GPS information; a memory storing map information of golf courses, each comprising at least one hole and at least one feature on the hole; one or more processors configured to determine a distance between the device and a location on a golf course stored in the memory as part of the map information; a body comprising a front surface and a rear surface; and a display screen configured to display information.

In one aspect, a method of operating a golf GPS device comprises: providing any golf GPS device described in the present disclosure; displaying a golf course map including a green; displaying the green with a plurality of selectable features, each selectable feature being associated with a point on the green; receiving a user selection of one of the plurality of selectable features; and displaying a distance between the device and the point associated with said one of the plurality of selectable features.

BRIEF DESCRIPTION OF DRAWINGS

The foregoing and other features, aspects and advantages of the present invention are described in detail below with reference to the drawings of various embodiments, which are intended to illustrate and not to limit the invention. The drawings comprise the following figures in which:

FIGS. 6A and 6B illustrate flowcharts depicting methods of displaying a hole cup distance in accordance with an embodiment;

FIGS. 8A and 8B illustrate display screens of a golf GPS device in accordance with an embodiment;

FIGS. 12A and 12B illustrate display screens of a golf GPS device in accordance with an embodiment.

DETAILED DESCRIPTION OF EMBODIMENTS

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

As used herein, the terms "golf GPS device," "GPS device," and "device" may be used interchangeably. A golf GPS device may include a standalone GPS, a GPS application or software installed on a mobile device, or any computing device, presently known or developed in the future, that is configured to provide a GPS functionality. Further, as used herein, the terms "player," "user," and "player-user" may be used interchangeably.

Figure 1:
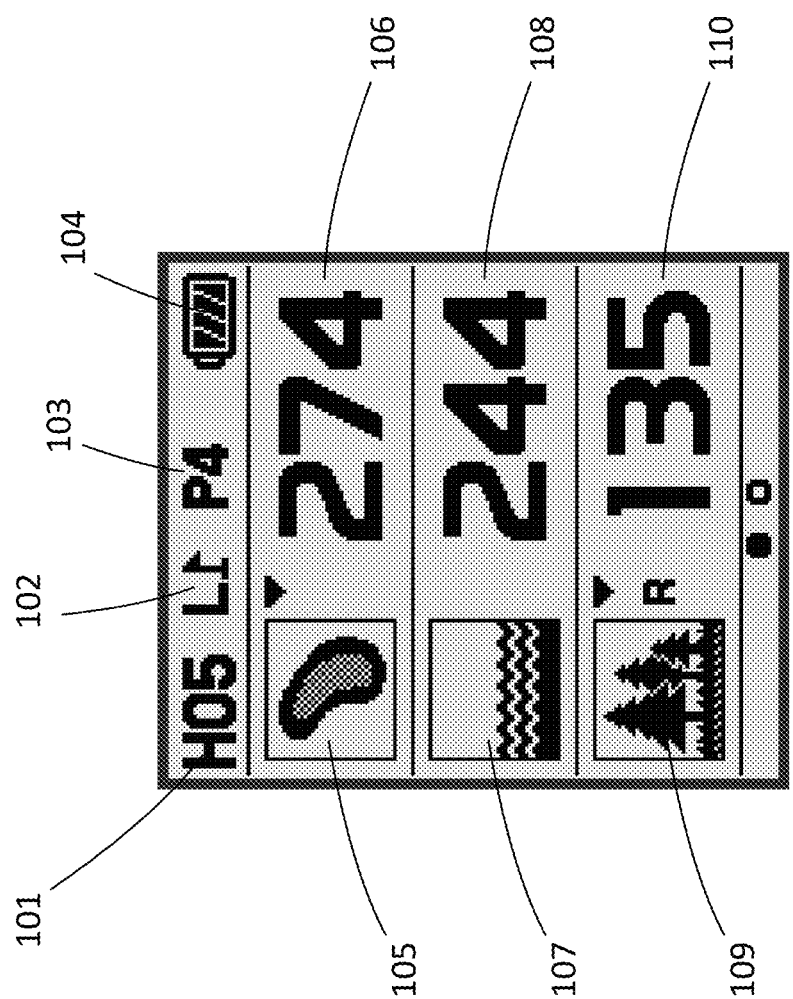
FIG. 1 illustrates a display screen of a golf GPS device.

A golf GPS tracks a player's location on a golf course and provides a variety of distance information to the player, such as the distance between the user and the green, the distance between the user and the tee box, or the distance between the user and the fairway. For example, the device may display a plurality of distances to various features and objects (e.g., fairway, trees, ponds, bunkers, and the putting green) that would be of the player's interest, as illustrated in FIG. 1. In the example illustrated in FIG. 1, the display includes a hole number indicator 101, left/right green indicator 102, par indicator 103, battery indicator 104. In addition, the display includes a green indicator 105 and the distance 106 to the green, a hazard indicator 107 and the distance 108 to the hazard, and a tree indicator 109 and the distance 110 to the tree. A game of golf typically involves playing 18 holes, and in each hole, the objective is to hit the golf ball into the hole cup located on the green. Thus, being able to accurately estimate the distance to the hole cup is important, because depending on the remaining distance to the hole cup, a different golf club may be used to strike the ball.

However, for any particular hole, the location of the hole cup may not be fixed, the exact location of the hole cup on a particular day may be unknown to the user. For example, the amount of traffic near the hole may damage the grass and the soil more quickly, and thus the hole cup may be periodically (e.g., daily) moved to a new location on the green. Such new location may be chosen arbitrarily or selected from a plurality of predetermined hole cup locations. Aside from monitoring the hole cup locations in all the golf courses in real time, it may be difficult for a golf GPS device to provide the exact location of the hole cup at a particular time that the user is on the course.

Figure 2:
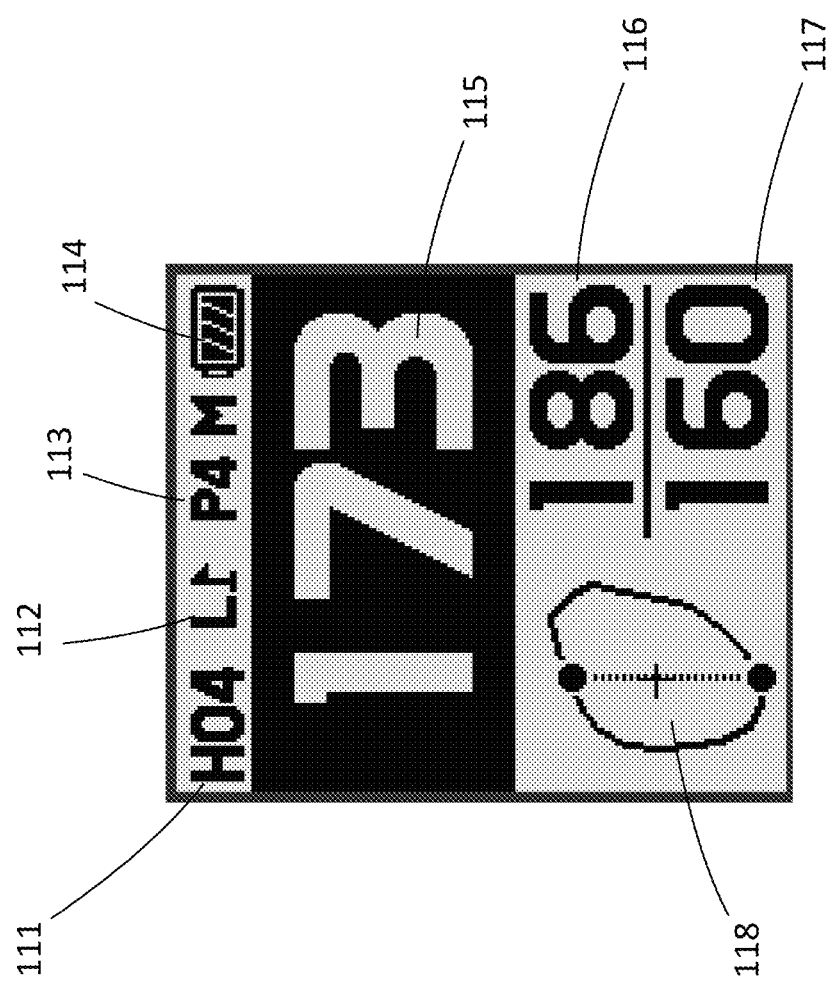
FIG. 2 illustrates a display screen of a golf GPS device.

To deal with such a problem, a golf GPS device may provide distances to nearby immobile features that are located near the hole cup in the particular hole. For example, the device may display distances to the boundaries of the green (e.g., both closest end and farthest end from the user) and a midpoint therebetween, as illustrated in FIG. 2. In the example illustrated in FIG. 2, the display includes a hole number indicator 111, left/right green indicator 112, par indicator 113, battery indicator 114. In addition, the display includes a distance 115 to the center of the green, a distance 116 to the back of the green, and a distance 160 to the front of the green. The display further includes a dynamic green indicator marking the positions of front, center, and back of the green. One way of determining the distance information is to determine the GPS coordinates of the current location of the device and the center of the green of the current hole stored in the device and to calculate the distance between the current location and the center and edges of the green that are on the straight line connecting the current location and the center. However, unless the hole cup is located on the line between the user and the center of the green, it would be difficult for the user to estimate the actual distance to the hole cup from the information provided to the user in FIG. 2.

Figure 3:
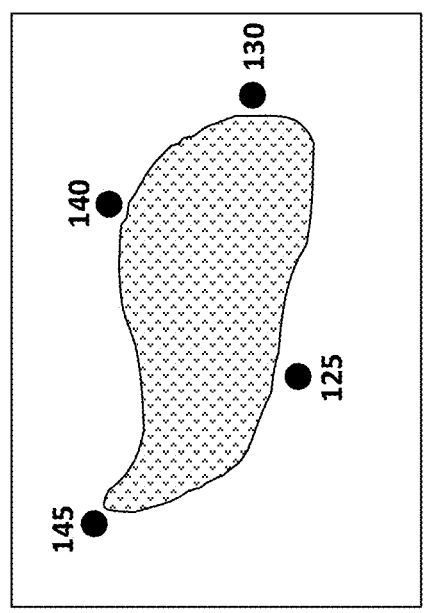
FIG. 3 illustrates a display screen of a golf GPS device.

Alternatively, the device may provide distances to numerous edges of the green to allow the user to estimate the distance from his or her current location to the hole cup, as illustrated in FIG. 3. Although the information provided to the user in the configuration of FIG. 3 may be more helpful to the user in estimating the distance to the hole cup when the hole cup is not aligned with the line between the user and the center of the green, it may still be difficult for the user to estimate the distance to the hole cup. For example, if the hole flag (e.g., the flag located at the hole cup to inform the players of the location of the hole cup) is visible to the user and the user can see that the flag is somewhere between the dots marked 125 yd, 130 yd, and 140 yd in FIG. 3, the user may figure out that the distance would be somewhere between 125 yards and 140 yards. However, estimating the distance to the hole cup based on the distance information of one or more edges of the green still requires mental calculation and lacks in accuracy and is subject to human error.

Thus, a simpler method of providing more accurate distance information to the user is desired, especially when the user can eyeball the location of the hole cup or otherwise has information about the location of the hole cup.

Golf GPS Device

Figure 4:
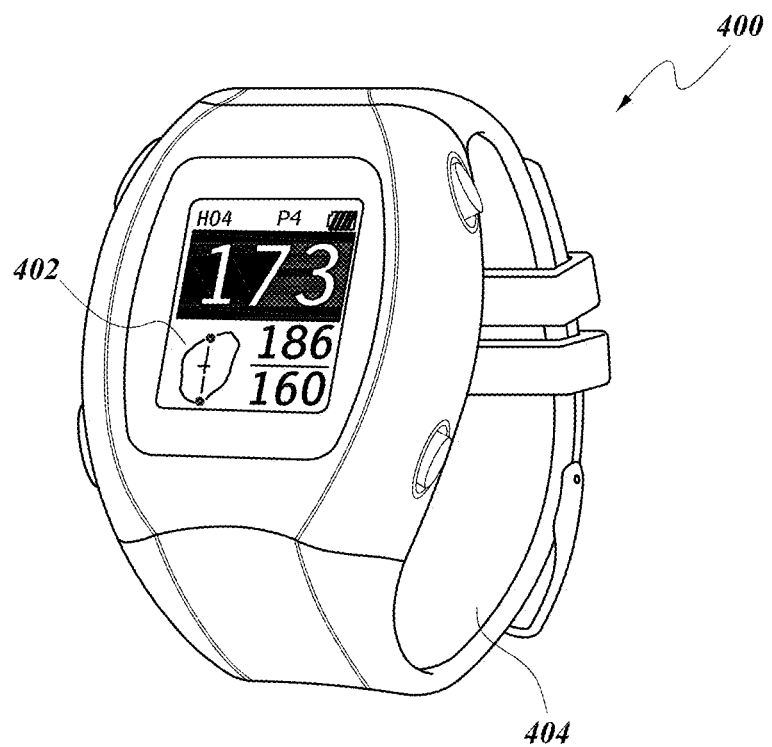
FIG. 4 illustrates a perspective view of a golf GPS device in accordance with an embodiment.

FIG. 4 illustrates a perspective view of a golf GPS device in accordance with an embodiment. As shown in FIG. 4, golf GPS device 400 may have a display screen 402 for conveying visual information to the user. Strap 404 may be provided for attaching the golf GPS device to the user (e.g., to the user's wrist). Although not shown in FIG. 1, the golf GPS device discussed herein may include a clip for attaching the golf GPS device to the user (e.g., to the user's hat, belt, shirt, pocket, etc.). As further discussed below, the golf GPS device 400 may include one or more buttons or sensors for receiving the user's input.

Figure 5:
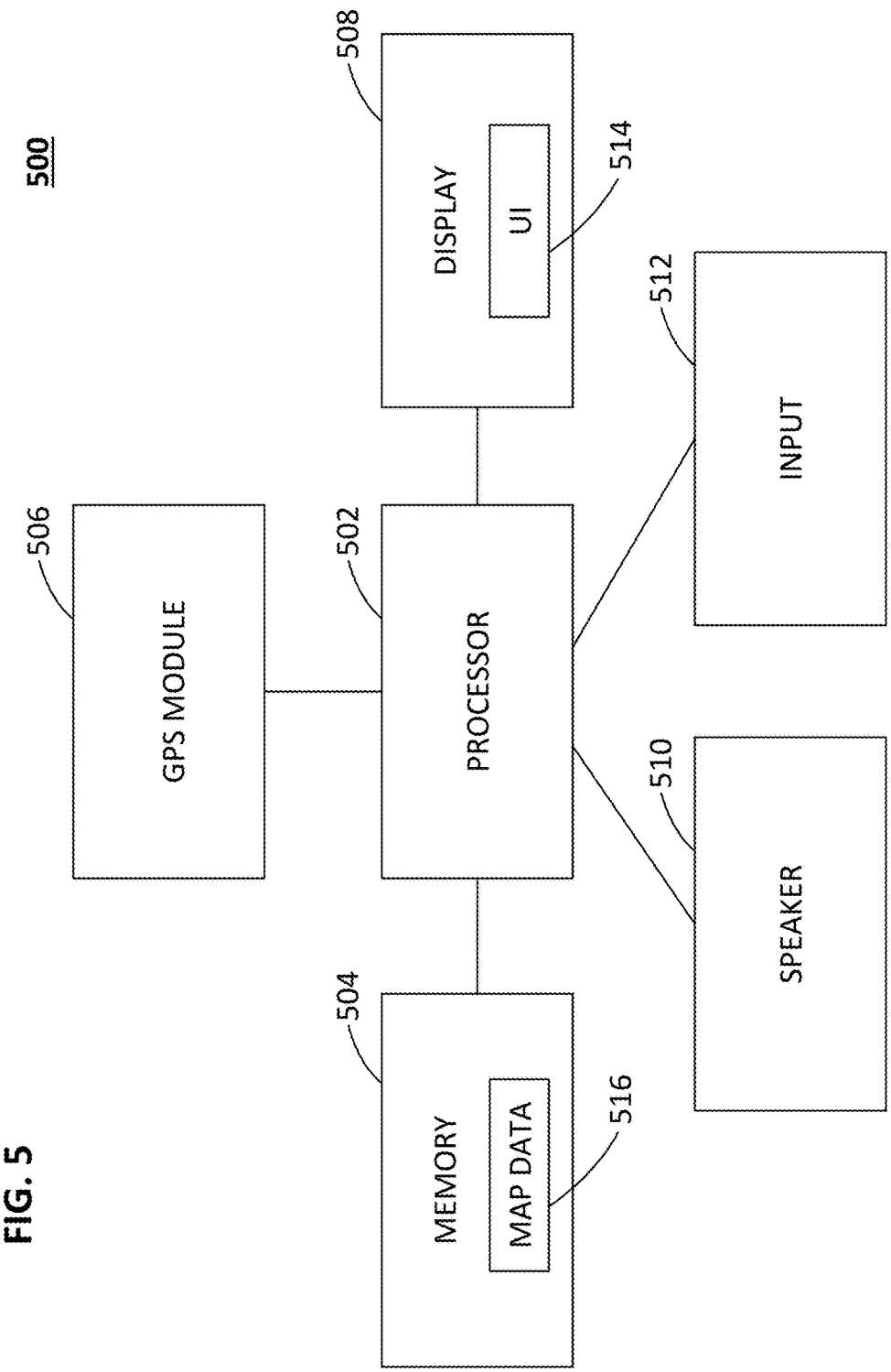
FIG. 5 illustrates a block diagram of a golf GPS device in accordance with an embodiment.

FIG. 5 illustrates a block diagram of a golf GPS device, according to an embodiment of the present disclosure. As shown in FIG. 5, golf GPS device 500 may include processor 502, memory 504, GPS module 506, display 508, speaker 510, and input 512. In addition, user interface (UI) 514 may be provided to the user via the display 508. The components illustrated in FIG. 5 may be housed in a body as shown in FIG. 4.

The processor 502, memory 504, GPS module 506, display 508, speaker 510, and input 512 (e.g., buttons shown in FIG. 4) included in the golf GPS device 500 may be chosen from ones that are currently well known and commercially available or those that are to be developed in the future. For example, the device 500 can include one or more displays that can visually convey information and/or speakers that can verbally convey information. Although both of the display 508 and the speaker 510 are shown in the example of FIG. 5, the device 500 may also be implemented with just one of them. The input 512 can include one or more sensors and/or mechanical, electrical, and digital buttons that facilitate the user to instruct the device 500 to perform certain functions. More than one button and/or sensor may be utilized in combination to activate a particular function. It is understood that the various inputs and outputs described herein may be located on any surface of the golf GPS device. It is further understood that the various inputs and outputs described herein may be combined into fewer components and that each input and/or output can be configured to perform other functions in addition to those shown in the depicted embodiments.

Processor

The processor 502 communicates with other components in the device 500, including the memory 504, GPS module 506, display 508, speaker 510, and input 512. The processor 502 may execute software to determine the distance between the device 500 and a predetermined or user-specified location on a golf course and causes the distance to be output to the user (e.g., via the display 508 or the speaker 510. The processor 502 may comprise one or more processors. The processor 502 may be implemented with one or more chips.

Memory

The memory 504 may store map data 516 of numerous golf courses and other information related to the golf courses. Each golf course may include one or more holes having one or more features (e.g., bunker, tree, pond, green, etc.). For example, the memory 504 may be sufficiently large as to store data of many different golf courses from around the world. Each golf course may have 9 holes, 18 holes, or any other number of holes. Further, in certain embodiments, audio and visual data in multiple languages can be stored in the memory 504. In addition, any information that may be used in connection with estimating distances on a golf course may be stored in the memory 504.

The memory 504 can store at least some of the software that can control the operation of the golf GPS device and provide the functionality of the golf GPS device. The memory 504 may include a combination of assorted conventional storage devices such as buffers, registers, and memories. For example, the memory 504 may include one or more of read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc. The memory 504 may be implemented with one or more chips.

GPS Module

The GPS module 506 receives signals from satellites and/or other signals such as correction signals, and calculates the positional coordinates of the GPS module 506. The golf GPS device 500 may utilize this positional data to calculate (e.g., by the processor 502 and/or the GPS module 506) and display distances to features or selected locations on a golf course.

Display

The display 508 may provide the user with the distance information determined by the processor 502. For example, the display 508 may be provided on the front surface of the device 400 shown in FIG. 4.

The display 508 may include one or more display screens that display, e.g., under the control of the processor 502, distances to features or selected locations on a golf course. The one or more display screens can be any of various conventional displays such as a liquid crystal display (LCD), a light-emitting diode (LED) display, etc., or any other display means to be developed in the future. In certain embodiments, the display 508 is a color display. In other embodiments, the display 508 is not a color display but is grayscale. The display 508 may be equipped with a touch sensitive display. As shown in FIG. 5, the display 508 may provide the user with the UI 514 for communicating with the golf GPS device 500.

In some embodiments, the display screen 208 displays details of a golf course where the golf GPS device is currently located. Such details can include the distance between the golf GPS device's current location and various locations along a particular hole. Such locations can include the front of the green, back of the green, center of the green, front of a hazard, back of a hazard, front of the fairway, back of the fairway, the hole cup, and any other notable locations in the particular hole (or in other holes of the golf course). The display 508 can further display details of a golf course of the user's choice. In other embodiments, the display 508 displays only a map of the green of a particular hole. For example, the particular hole can be where the golf GPS device 500 is currently located. In some embodiments, the display 508 displays the hole number and/or par number of the hole the device is currently located at or any other hole.

Speaker

The speaker 510 may provide the user with the distance information determined by the processor 502. For example, the speaker 510 may be housed in the body of the device 400 shown in FIG. 4.

In some embodiments, the speaker 210 audibly reports to the user information relating to distances and/or other features of the golf course. For example, the device 500 can audibly report to the user the distance between the device's current location and various locations along a particular hole. Such locations can include the front of the green, back of the green, center of the green, front of a hazard, back of a hazard, front of the fairway, back of the fairway, the hole cup, and any other notable locations in the particular hole (or in other holes of the golf course). In some embodiments, the device 500 can report such distances and/or features to the user in more than one language. In certain embodiments, the device 500 can also audibly report to the user the hole number, par number, and/or name of the golf course in which the device 500 is currently located.

In some embodiments, the voice reporting may be only activated upon receiving instructions from the user. For example, the instruction can be pressing a button on the device 500 or other method of input.

Input

The input 512 may include one or more sensors and/or mechanical, electrical, and digital buttons that facilitate a user to instruct the device 500 to perform certain functions. More than one button and/or sensor may be utilized in combination to activate a particular function. For example, the device 500 may comprise a power button, a position mark button, and a volume control. The power button may be activated by the user to turn the device 500 on or off. The position mark button may be activated by the user to mark the current location of the device 500 and calculate the distance between the current location and a previously marked location, if any. The volume control may be activated by the user to control the volume of the speaker 510.

User Interface

As shown in FIG. 5, the UI 514 may be presented to the user via the display 508. The UI 514 may provide a communication channel between the user and the device 500, allowing the user to enter various commands, e.g., via the input 512 provided on the device 500. The UI 514 may be a graphical user interface (GUI) that is displayed on the display 508 and may include various graphical elements, selectable features, and distance information, which help the user navigate through the golf course and the game of golf.

Software

The device 500 may run software that, when executed by the processor 502, provides the device 500 with the functionalities described herein. For example, the software of the device 500 may determine, track, and/or display useful golf-related information before, during, and/or after the game of golf. The software may perform a variety of golf-related methods, some of which are illustrated below in connection with FIGS. 6A and 6B.

FIG. 6A

FIG. 6A shows a flowchart for a method of displaying a hole cup distance, according to an example embodiment. For example, a portion or all of the method illustrated in FIG. 6A may be performed by one or more components of device 500 shown in FIG. 5.

In block S600, it is determined whether selectable features should be displayed on the green. The determination of whether selectable features should be displayed on the green may include various factors such as the user's distance to the green, the flag's visibility, user input, etc., as further discussed below. If it is determined that the selectable features should be displayed (YES, S600), a plurality of selectable features are displayed on the green or its vicinity on the display of the device (block S610). Upon receiving the user selection of a particular one of the plurality of selectable features (block S620), a distance value representing the distance between the device and the point associated with the selected particular one of the plurality of selectable features is calculated (or obtained from a storage location) (block S630). The distance value is then provided to the user (block S640).

FIG. 6B

FIG. 6B shows a flow chart for a method of displaying selectable features, according to an embodiment of the present disclosure. For example, a portion or all of the method illustrated in FIG. 6B may be performed by one or more components of device 500 shown in FIG. 5.

In block S611, it is checked whether selectable features having predetermined shape and location are stored in the memory. If the selectable features are stored in the memory (YES, S611), the stored selectable features are retrieved from the memory (block S612) and displayed to the user (block S613). On the other hand, if it is determined that selectable features are not stored in the memory (NO, S611), multiple positions are selected (e.g., randomly) on the green (block S614), the shape and size of the markings or segments are determined (block S615), and the markings or segments of the determined shape and size are superimposed over the selected positions, respectively, on the displayed green (block S616). The shape and size of the markings or segments may be randomly selected from a predetermined plurality of shapes and sizes. Alternatively, the shape and size of the markings or segments may be determined such that they are proportional to the size of the displayed green (e.g., green displayed on the display screen). In the example of FIG. 6B, the order in which the individual steps are performed may be switched when applicable. For example, in another embodiment, instead of selecting the multiple positions on the green and then superimposing markings and/or segments over the selected positions, markings and/or segments may be placed over the green, and then the positions corresponding to each of such markings/segments may be determined (e.g., by choosing the center point of such markings/segments).

In some embodiments, one or more of the steps illustrated in FIGS. 6A and 6B are omitted. For example, instead of determining whether selectable features are stored in memory, as shown in FIG. 6B, a golf GPS device may simply perform the steps S614-S616 (or alternatively, steps S612 and S613), when selectable features are to be displayed.

In the sections below, more detailed explanations and examples are provided for performing the methods illustrated in FIGS. 6A and 6B.

Selectable Features

Figure 8B:
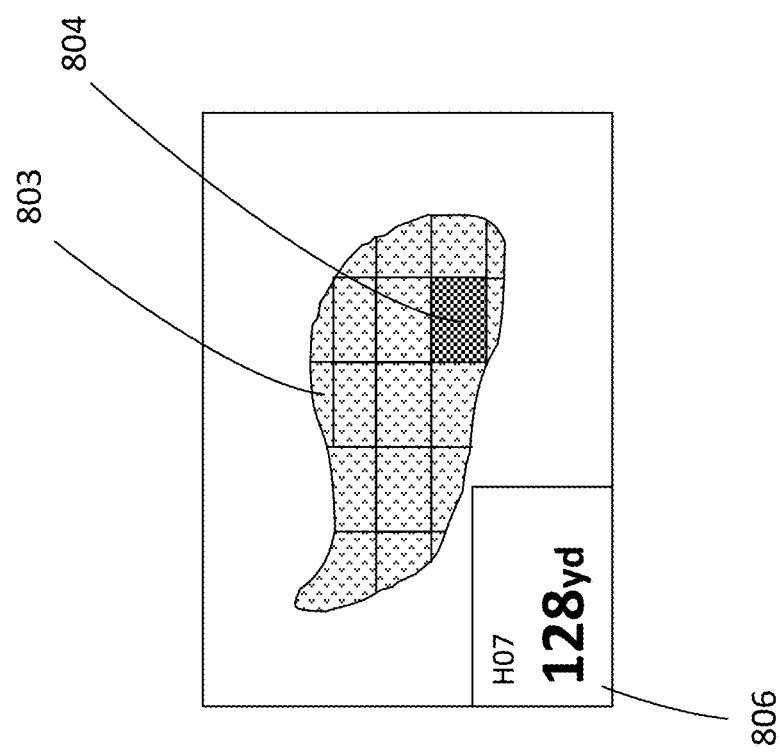
Figure 9A:
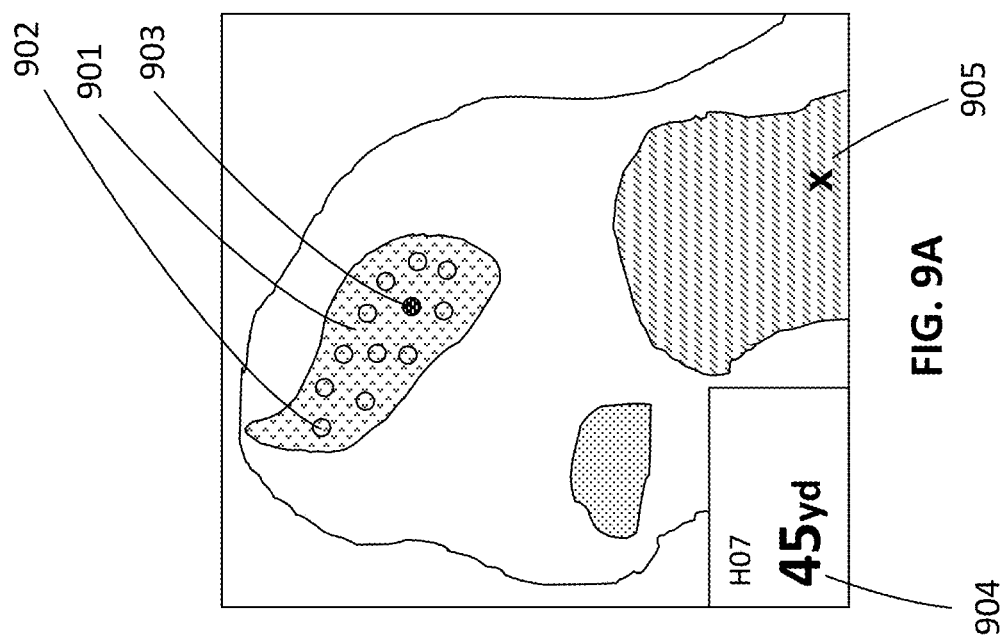
FIGS. 9A and 9B illustrate display screens of a golf GPS device in accordance with an embodiment.
Figure 9B:
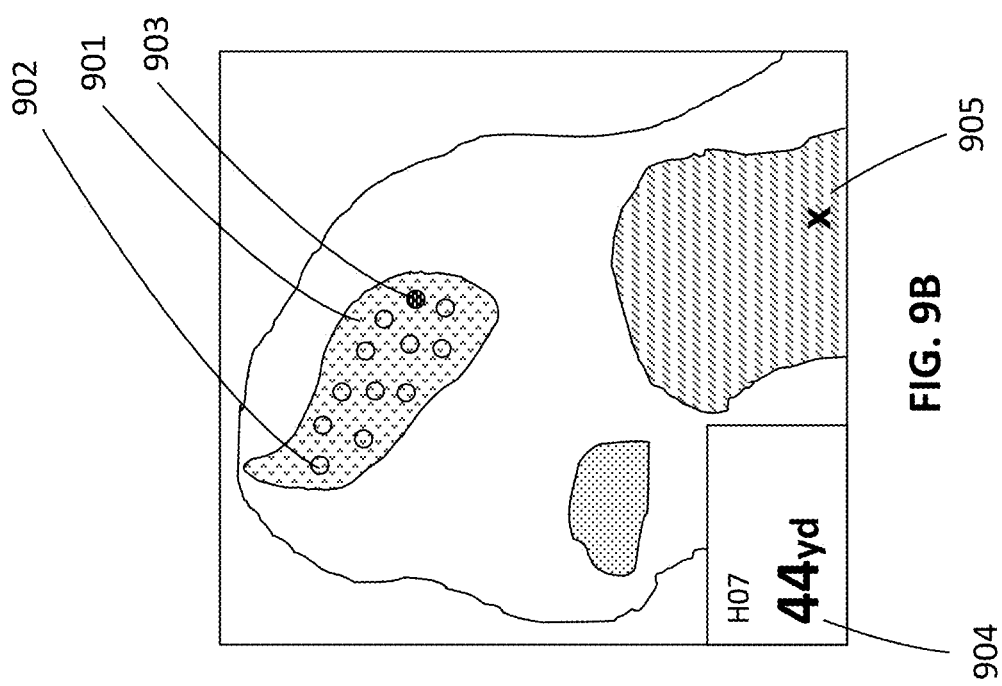

Selectable features discussed in the present disclosure may be icons or markings (e.g., *, +, X or O mark or a checkmark) that may be displayed on the display of the device (e.g., on the displayed green) to represent the potential locations of the hole cup on the actual green, as illustrated in FIGS. 9A and 9B. In the example illustrated in FIGS. 9A and 9B, the display includes the displayed green 901, non-highlighted selectable features 902, and highlighted selectable features 903. The display further includes distances 904 to the highlighted selectable feature 903, and markers 905 for indicating the user's current location. The selectable features may also include a plurality of segments into which the displayed green is segmented, as illustrated in FIGS. 8A and 8B. Each selectable feature may correspond to a specific location on the actual green, and when the user selects a particular selectable feature, the distance between the user (e.g., the device) and the specific location on the actual green that corresponds to the particular selectable feature selected by the user may be determined and output to the user (e.g., via the display or the speaker).

When to Display Selectable Features on Green

In embodiments, the device begins to display selectable features when a certain event occurs. In one embodiment, the plurality of selectable features are displayed on the green when the user first enters a region that is within a predetermined distance from the green or from a predetermined location of each hole. In another embodiment, such selectable features are displayed for user selection when the location of the user first has an unobstructed view of the flag on the actual green and/or the green. In another embodiment, the selectable features are displayed whenever the green is displayed on the display screen. In yet another embodiment, such selectable features are displayed for user selection when a particular input is received from the user (e.g., specific button combination, activation of a dedicated button, or holding down a button for a predetermined amount of time).

Selectable Features Stored in the Memory

Selectable features may be stored in the memory (e.g., memory 506 of FIG. 5) of the golf GPS device. In one embodiment, the selectable features are part of the map data (e.g., map data 516 of FIG. 5). In another embodiment, the selectable features are stored separately from the map data and associated with the map data for the corresponding golf courses. When the selectable features are stored in the memory, the processor can simply retrieve the stored selectable features and display them to the user via the display.

Selectable Features Not Stored in the Memory

As discussed with reference to FIG. 6B, in some embodiments, selectable features are not stored in the memory. In such a case, selectable features are created, for example, by the processor on the fly. For example, the selectable features may be generated at the beginning of the course (e.g., by determining randomly scattered locations on the green of each hole on the course), at the beginning of each hole, or right before the selectable features are displayed on the green. In one embodiment, a plurality of positions (e.g., points, GPS coordinates, etc.) are selected from the green by the processor. Such points may be sampled from the actual green or the displayed green. In one embodiment, the plurality of positions span the entire green. In another embodiment, the plurality of positions are not selected from portions of the green that are near the edge portions of the green (e.g., within a predetermined distance from the edge of the green, where the hole cup is unlikely to be located). In one embodiment, the positions are spread out such that they are roughly equidistant from each other. For example, the positions may be located within 1 yard of each other. In another embodiment, the positions may be farther away from each other (e.g., 3, 6, or 9 yards).

In one example, the positions selected from the green by the processor may include nine points spread out over the green, including the (1) front left portion, (2) front center portion, (3) front right portion, (4) mid-left portion, (5) mid-center portion, (6) mid-right portion, (7) back left portion, (8) back center portion and (9) back right portion of the green, respectively. In the example illustrated in FIG. 12A, the selected positions include 9 locations, the center of the green being the mid-center portion described above. In another embodiment, the number of positions selected is greater than 9. In another embodiment, the number of positions selected is less than 9. The device may determine the positions based on the history of user-submitted data regarding the hole cup location. For example, the device may allow the users to submit the hole cup location and save the submitted hole cup location data in a database. Alternatively, the device may infer hole cup locations from the movement pattern of the users and store such hole cup location data in a database (e.g., in a global or local database).

Figure 10A:
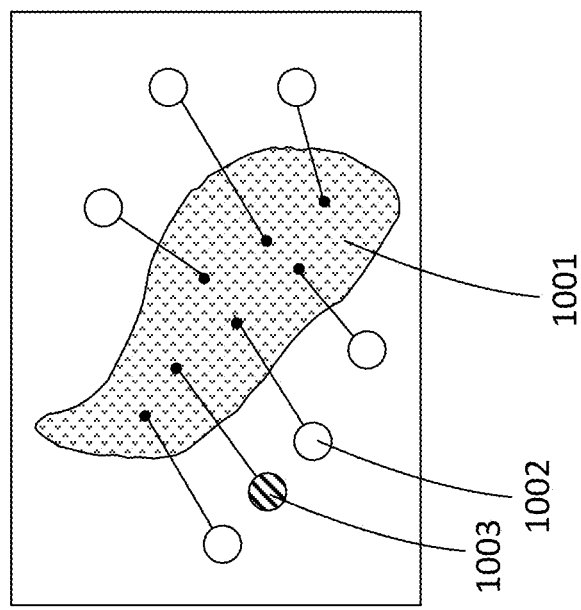
FIGS. 10A and 10B illustrate display screens of a golf GPS device in accordance with an embodiment.

Further, the shape and size of the selectable features (e.g., icons, markings, segments, etc. that are displayed on the display screen of the device) may be determined by the processor. For example, the shape may be an arbitrary shape, a grid, a polygon or any other shape. In one embodiment, the shapes are stored in the memory along with the map data. In another embodiment, the sizes of the selectable features are stored in the memory along with the map data. In yet another embodiment, both the shapes and the sizes of the selectable features are stored in the memory along with the map data. In one embodiment, the shapes and sizes are stored independently of the map data. In another embodiment, the user may specify (or preset a preference for) the shape and size of the selectable features. In one embodiment, the selectable features may overlap with each other. In another embodiment, the selectable features do not overlap with each other. In some embodiments, the selectable features are displayed on the green itself. In other embodiments, the selectable features are displayed outside of the green. For example, each of the selectable features may have an arrow pointing into or a link connecting to a corresponding location on the green, as illustrated in FIG. 10A. In the example illustrated in FIG. 10A, the display includes a displayed green 1001, a non-highlighted selectable features 1002, and a highlighted selectable feature 1003.

In one embodiment, in a case that the shape and size of the selectable features are determined or provided before the positions on the actual green are determined or calculated, the selectable features are placed on the green, in the determined shape and size in association with various locations on the displayed green, wherein each specific location of the various locations has a corresponding position (e.g., GPS coordinates) on the actual green that is assigned to the selectable feature displayed at the specific location on the displayed green.

Associating Positions on the Green with Selectable Features

In one embodiment, in the case that positions are determined before the shape/size of the selectable features are determined, one selectable feature is created for each of the determined positions, and the corresponding positions and selected features are associated or linked with each other.

In one embodiment, in the case that selectable features are determined before the positions on the green are determined, each of the selectable features is preferably associated or linked with a position on the green (e.g., point or a set of GPS coordinates), to be used for calculating the distance between the device and the selectable feature. In one embodiment, each of the selectable features (e.g., flag, icon, segment, etc.) may have a pre-assigned point with which it is associated or linked. For example, each selectable feature displayed on the displayed green may be associated with a specific point on the actual green or the GPS coordinates thereof. For example, if a flag or an icon is displayed on the displayed green, the flag or icon may be associated with the position on the actual green that corresponds to the location of the flag or icon on the displayed green.

In embodiments, when a particular segment displayed on the displayed green is selected by the user, the distance between the device and a point associated with or within the selected segment (e.g., the center point of the segment) may be calculated and displayed to the user. The actual calculation of the distance may be performed before or after the user selection of a particular selectable feature displayed on the displayed green. For example, upon displaying the plurality of selectable features for user selection, the distance between the device and each of the points associated with such features may have already been calculated and associated with the corresponding feature. Thus, upon user selection of a particular selectable feature, the distance associated with the selected feature is immediately provided to the user (e.g., via the display or the speaker).

Shapes/sizes and Locations Associated with Selectable Features

When the green is segmented to create segments, and such segments are displayed as the selectable features, not all segments may be associated with a position on the green. In one embodiment, if a particular segment borders the boundary of the green (e.g., one side of the segment shares the border with the edge of the green), the particular segment is not associated with a position on the green. In one embodiment, if a particular segment borders the boundary of the green, the particular segment may not be selectable by the user. For example, in the example shown in FIG. 8B, the edge segment 803 may not be selectable and/or associated with a position on the green, since the edge segment 803 is unlikely to correspond to the actual hole cup location because hole cups are typically not placed near the edge of the green. In one embodiment, if a particular segment is cut (e.g., to render it to be smaller than other segments) by the boundary lines of the green, the segment is not selectable, since such a segment is unlikely to correspond to the actual hole cup location. In another embodiment, each and every segment created is selectable and associated with a position on the green.

On the Green vs. Outside the Green

Generally, features outside the green (e.g., bunker, hazard, trees, etc.) are immobile and may be preconfigured into the map data. However, the hole cup location often changes daily, and thus, a fixed, predetermined distance provided to the user as representing the distance to the hole cup is unlikely to be an accurate estimate of the distance to the actual hole cup. Accuracy is much more important on the green than outside the green because a small miscalculation in yardage (e.g., 1 yard from the hole vs. 3 yards from the hole) can make a significant difference on the green.

In some embodiments, selectable features (e.g., those similar to the ones described in the present disclosure) may be displayed outside the green. In some embodiments, similar selectable features may be displayed on the boundary of the green. In some embodiments, selectable features are only displayed on the green. In other embodiments, selectable features are displayed both on the green and outside the green. In some other embodiments, selectable features are provided throughout the hole or in select areas of the hole.

Displaying Distance Information

Figure 7:
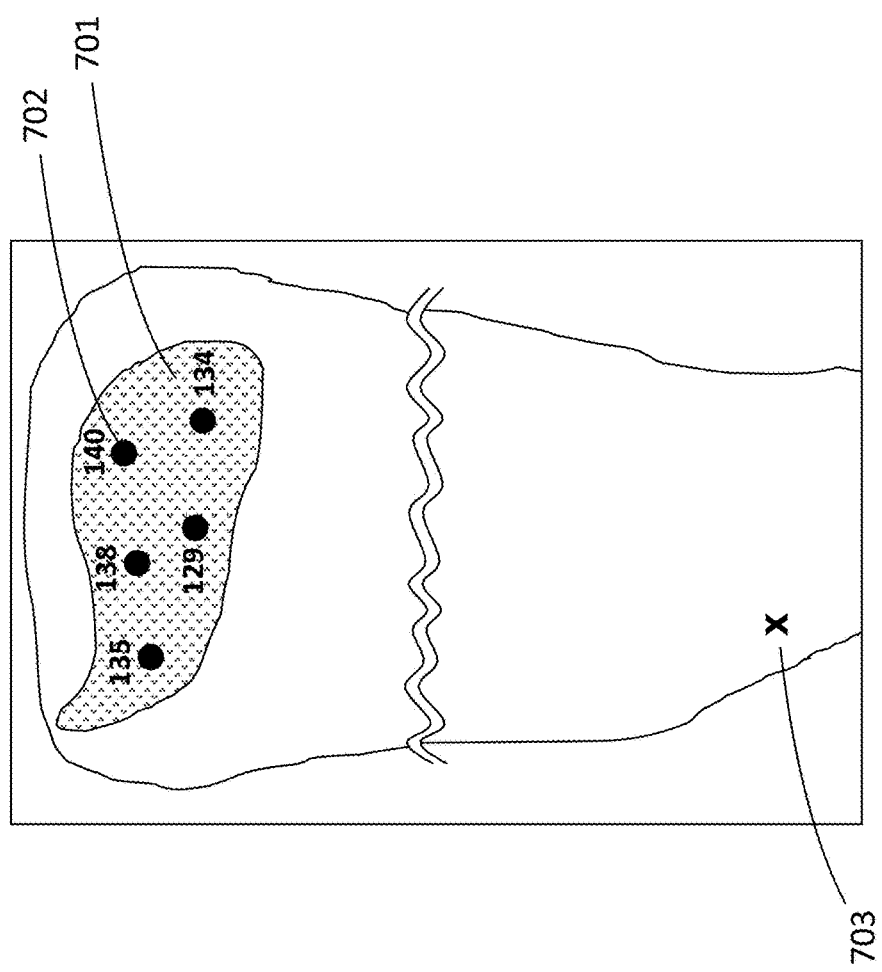
FIG. 7 illustrates a display screen of a golf GPS device in accordance with an embodiment.

In one embodiment, the pre-calculated distance values may be displayed alongside each of the selectable features, as shown in FIG. 7. In the example illustrated in FIG. 7, the display includes a plurality of selectable features 702 displayed on a displayed green 701. As shown in FIG. 7, pre-calculated distance values (corresponding to the distance from the current location 703 of the user to each of the locations corresponding to the selectable features) are displayed alongside each of the selectable features 702. However, the display screen may be too small to effectively convey to the user the distance information associated with each of the plurality of selectable features. Or, other features outside of the green may have to be displayed along with the green, leaving less room on the display screen for the green to effectively superimpose the distance information on top of the green for each of the selectable features. In such a case, the distance information may be provided to the user upon selection of a particular selectable feature as shown in FIGS. 8 and 9.

Toggling Through Selectable Features

In one embodiment, the user may toggle through the plurality of selectable features using one of the buttons provided on the device. In the example illustrated in FIGS. 8A and 8B, the display includes a displayed green 801, currently-highlighted (or currently-selected) selectable segments 802 and 804, and a non-selectable edge segment 803 of the green. The display further includes the distances 805 and 806 to the currently-selected selectable segments 802 and 804, respectively. For example, in the example of FIGS. 8A and 8B, when the user activates a button on the device, the currently-highlighted segment is changed from that shown in FIG. 8A to that shown in FIG. 8B, and the distance information is automatically updated, from that corresponding to the segment highlighted in FIG. 8A to that corresponding to the segment highlighted in FIG. 8B. The device may have one button that allows the user to toggle through the selectable features in one predetermined order, another button that allows the user to toggle through the selectable features in another order that is opposite to the predetermined order, and yet another button that allows the user to select the currently highlighted feature. In another embodiment, the distance information is displayed to the user only after the user has selected a particular selectable feature. For example, in FIG. 10A, the second selectable feature from the left is highlighted for immediate user selection (e.g., can be selected by the user with the activation of a button).

The toggling via one or more buttons may also be available even if the device is equipped with a touch-screen display. In one embodiment, the one or more buttons for controlling the toggling are physically provided on the device and are activated by user input (e.g., touch or voice command). In another embodiment, the one or more buttons for controlling the toggling are digitally displayed on the touch-screen display and are activated by touch.

Displaying Distance Information

Figure 10B:
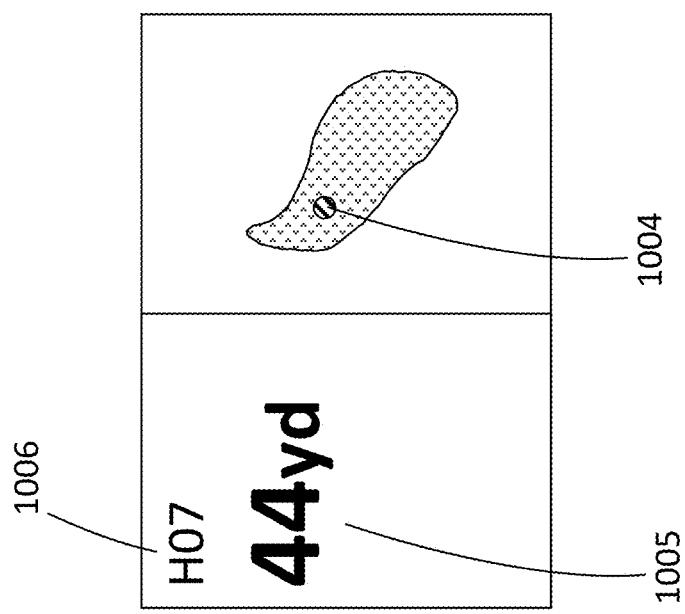

Once the user selects the highlighted selectable feature (e.g., by activating a button or providing a voice command), the selected hole cup location along with the distance to the selected hole cup location is displayed, as shown in FIG. 10B. In the example illustrated in FIG. 10B, the display includes a selectable feature 1004 that has been selected by the user, a distance 1005 to the location corresponding to the selectable feature 1004, and the hole indicator 1006. In one embodiment, the distance value is calculated upon such selection by the user. In another embodiment, the distance value is calculated as soon as the positions of the green are determined, and when a selectable feature is selected by the user, the distance value associated with the selectable feature is displayed to the user.

Detection of Touch Input

In the case of a touch-screen display, the user may simply touch the portion of the screen on which the particular selectable feature that the user wishes to select is displayed. In one embodiment, when the device detects a touch input by the user, the feature with the heaviest contact with the user's touch input is considered to have been selected by the user and the distance information associated with the selected feature is displayed to the user. In another embodiment, the feature that is closest to the point of contact is considered to have been selected by the user and the distance information associated with the selected feature is displayed to the user. In another embodiment, the device prompts the user to select between two features that are closest to the point of contact. In another embodiment, the device prompts the user to select between two features having contact with the user's touch input. In another embodiment, the device prompts the user to provide another touch input (e.g., try again) if the difference in the distances between the point of contact and the respective two features is within a threshold value. In another embodiment, the device prompts the user to provide another touch input (e.g., try again) if the difference in the weights of contact at the respective two features is within a threshold value.

Device Orientation

Figure 11A:
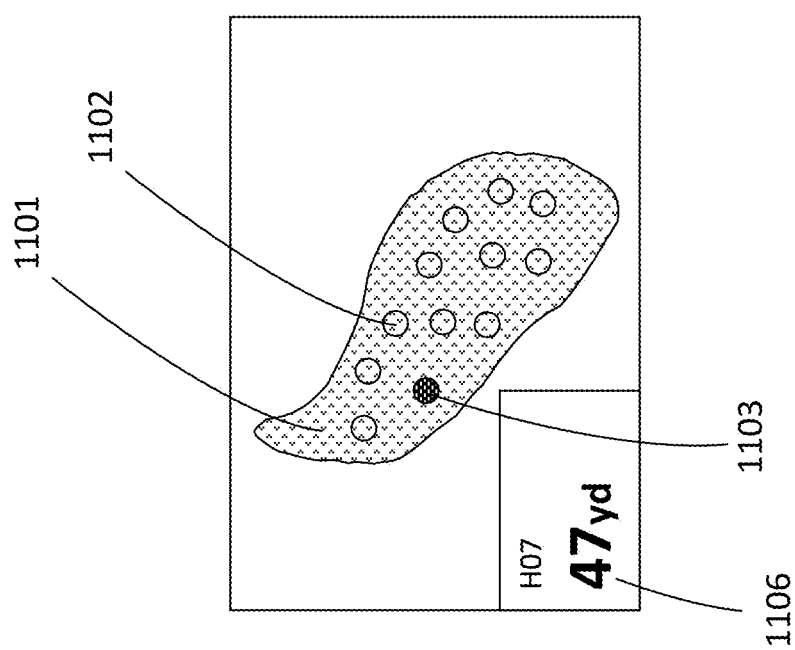
FIGS. 11A and 11B illustrate display screens of a golf GPS device in accordance with an embodiment.
Figure 11B:
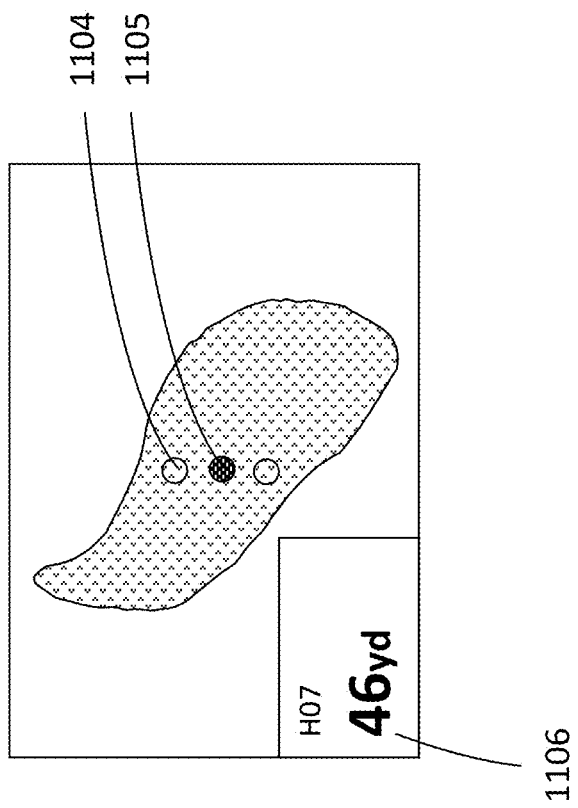

In one embodiment, when the user points the device towards a certain direction, only those selectable features that are located generally in the pointed direction remain to be selectable by the user. For example, after a plurality of selectable features are displayed on the green, as illustrated in FIG. 11A, the user may point or orient the device towards the flag to eliminate those selectable features that are not relevant for playing the particular hole. As shown in FIG. 11B, when the user points or orients the device towards the flag, only those selectable features that are on the direct line from the user to the flag remain on the green displayed by the device. In the example illustrated in FIGS. 11A and 11B, the display includes a displayed green 1101, non-highlighted selectable features 1102 and 1104, highlighted selectable features 1103 and 1105, and distances 1106 to the locations corresponding to the highlighted selectable features 1103 and 1105, respectively. As shown in FIG. 11B, from the remaining selectable features, the user may more conveniently select the feature that most closely represents the hole cup location as estimated by the user. In another embodiment, the user may be prompted, before displaying any selectable features on the screen, to point or orient the device towards the visible flag or hole cup (or any other direction) such that the number of selectable features displayed on the screen may be limited to those located in such direction. From the subset of selectable features displayed on the screen in the direction that the device is facing, the user can further select one of the selectable features based on eye estimation or other information (e.g., color of the flag indicating whether the hole cup is located near the front, center, or back of the green).

Example of Selectable Features

Figure 12B:
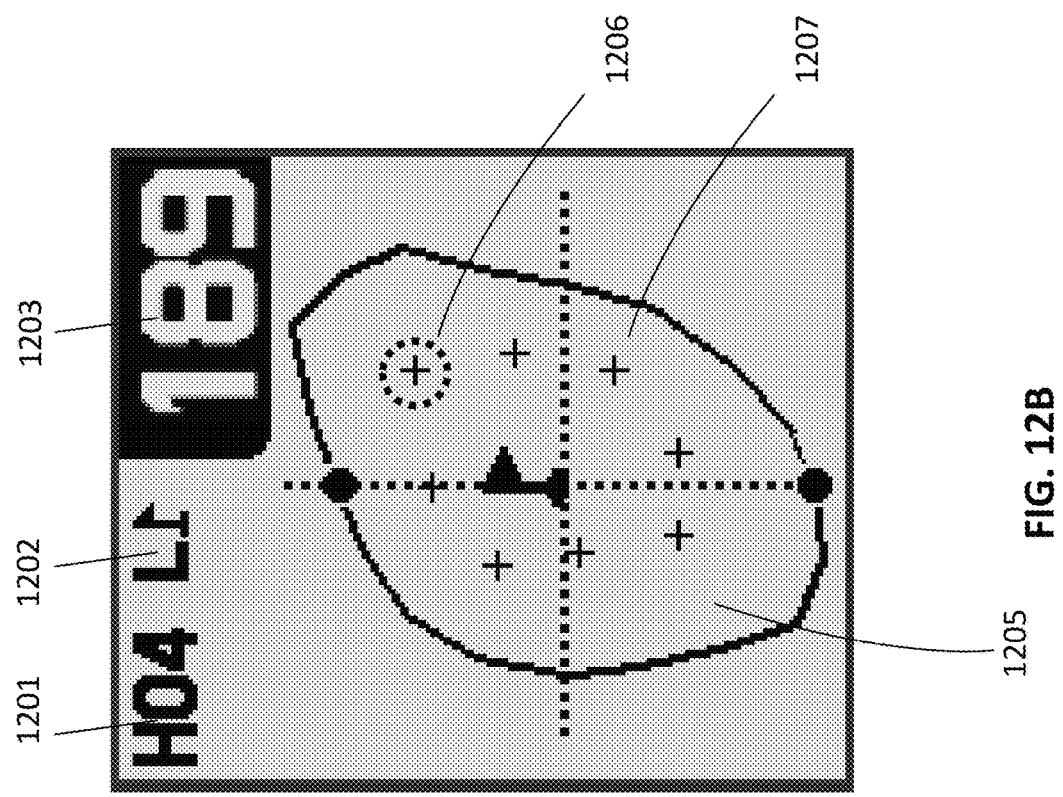

In another embodiment, the green displayed to the user may be as shown in FIGS. 12A and 12B. Such display may initially provide the user with an estimate of the distance to the center of the green. On the displayed green, the user may further select a particular selectable mark (e.g., indicated by the "+" sign) that most closely resembles the actual location of the hole cup, based on the user's eye estimation or other information. For example, the user may toggle through the selectable marks or select one of the selectable marks by providing a touch input. Upon user selection of the particular mark, the distance information provided to the user is updated to the distance between the user and the point on the green associated with the selected mark. In the example illustrated in FIGS. 12A and 12B, the display includes a hole indicator 1201, a left/right indicator 1202, distances 1203 to the locations corresponding to the highlighted selectable features 1204 and 1206, a displayed green 1205, highlighted selectable features 1204 and 1206, and non-highlighted selectable features 1207. In FIG. 12A, the currently highlighted mark 1204 is on the bottom left corner of the green and is 173 yards away from the user. In FIG. 12B, the currently highlighted mark 1206 is on the top right corner of the green and is 189 yards away from the user.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. An electronic device comprising:
   a memory;
   golf course data stored in the memory and comprising first data representing a green of a hole of a golf course, the golf course data further comprising second data representing a plurality of selectable features, wherein a first one of the plurality of selectable features corresponds to a first geographical location within a boundary of the green of the hole, and a second one of the plurality of selectable features corresponds to a second geographical location within the boundary of the green of the hole;
   a display configured to display, based on the first data, a graphical element depicting the boundary of the green of the hole, wherein the display is further configured to display the plurality of selectable features along with the graphical element depicting the boundary of the green such that the first selectable feature (i) visually indicates a first graphical location or area within the depicted boundary of the green and (ii) is displayed along with the second selectable feature that visually indicates a second graphical location or area within the depicted boundary of the green, wherein the second graphical location or area is different from the first graphical location or area;
   a GPS module configured to receive GPS signals, wherein the device is configured to determine a current geographical location of the device based on the GPS signals; and
   a user interface configured to receive a user selection among the plurality of selectable features,
   wherein in response to the user's selection of the first selectable feature, the device is configured to determine a first distance between the first geographical location corresponding to the first selectable feature and the current geographical location of the device, and
   wherein in response to the user's selection of the second selectable feature, the device is configured to determine a second distance between the second geographical location corresponding to the second selectable feature and the current geographical location of the device.

2. The device of claim 1, wherein the device is configured to highlight one of the plurality of selectable features for immediate selection by the user, wherein upon the user's command, the device is configured to de-highlight the highlighted selectable feature and to highlight another one of the plurality of selectable features in a predetermined sequence.

3. The device of claim 1, wherein the first selectable feature comprises an iconic representation placed over the first graphical location or area within the depicted boundary of the green.

4. The device of claim 1, wherein the first at selectable feature comprises an iconic representation linked to the first graphical location or area within the depicted boundary of the green via an indicating line.

5. The device of claim 1, wherein the first selectable feature comprises a segment within the depicted boundary of the green.

6. The device of claim 1, wherein the graphical element is partitioned into a plurality of segments comprising a first segment and a second segment, wherein the first segment corresponds to the first geographical location, wherein the first selectable feature is an iconic representation placed over the first segment or an iconic representation linked to the first segment by an indicating line.

7. The device of claim 1, wherein the first geographical location is predetermined and stored in the memory as part of the golf course data.

8. The device of claim 1, wherein either or both of a shape and a size of at least part of the plurality of selectable features are predetermined and stored in the memory as part of the golf course data.

9. The device of claim 1, wherein the first geographical location is not stored in the memory as part of the golf course data such that the first geographical location is determined when the device is physically located in the golf course.

10. The device of claim 1, wherein the device is configured to display only a subset of the plurality of selectable features within the depicted boundary of the green.

11. The device of claim 1, wherein upon determining the first distance, the device is configured to display the first distance on the display.

12. A method of operating the electronic device of claim 1, the method comprising:
   displaying the graphical element depicting the boundary of the green along with the plurality of selectable features such that the first selectable feature (i) visually indicates the first graphical location or area within the depicted boundary of the green and (ii) is displayed along with the second selectable feature that visually indicates the second graphical location or area within the depicted boundary of the green, wherein the second graphical location or area is different from the first graphical location or area;
   receiving the user's selection of the first selectable feature; and
   determining the first distance between the first geographical location corresponding to the first selectable feature and the current geographical location of the device.

13. The device of claim 12, wherein the first selectable feature comprises an iconic representation placed over the first graphical location or area within the depicted boundary of the green.

14. The device of claim 12, wherein the first selectable feature comprises an iconic representation linked to the first graphical location or area within the depicted boundary of the green via an indicating line.

15. The device of claim 12, wherein the graphical element is partitioned into a plurality of segments comprising a first segment and a second segment, wherein the first segment corresponds to the first geographical location, wherein the first selectable feature is an iconic representation placed over the first segment or an iconic representation linked to the first segment by an indicating line.

16. The device of claim 12, wherein the device is configured to highlight one of the plurality of selectable features for immediate selection by the user, wherein upon the user's command, the device is configured to de-highlight the highlighted selectable feature and to highlight another one of the plurality of selectable features in a predetermined sequence.

17. A golf GPS device comprising:
a display for displaying a map of a golf course; and
a memory storing golf course data comprising first data representing a green of a hole of the golf course, the golf course data further comprising second data representing a plurality of selectable features, wherein a first one of the plurality of selectable features corresponds to a first geographical location within a boundary of the green of the hole, and a second one of the plurality of selectable features corresponds to a second geographical location within the boundary of the green of the hole,
wherein the display is configured to display, based on the first data, a graphical element depicting the boundary of the green of the hole, wherein the display is further configured to display the plurality of selectable features along with the graphical element depicting the boundary of the green such that the first selectable feature (i) visually indicates a first graphical location or area within the depicted boundary of the green and (ii) is displayed along with the second selectable feature that visually indicates a second graphical location or area within the depicted boundary of the green, wherein the second graphical location or area is different from the first graphical location or area,
wherein the device is configured to receive a user's selection among the plurality of selectable features,
wherein in response to the user's selection of the first selectable feature, the device is configured to determine a first distance between the first geographical location corresponding to the first selectable feature and the current geographical location of the device, and
wherein in response to the user's selection of the second selectable feature, the device is configured to determine a second distance between the second geographical location corresponding to the second selectable feature and the current geographical location of the device.

18. The device of claim 17, wherein the device is configured to highlight one of the plurality of selectable features for immediate selection by the user, wherein upon the user's command, the device is configured to de-highlight the highlighted selectable feature and to highlight another one of the plurality of selectable features in a predetermined sequence.

19. The device of claim 17, wherein the graphical element is partitioned into a plurality of segments comprising a first segment and a second segment, wherein the first segment corresponds to the first geographical location, wherein the first at selectable feature is an iconic representation placed over the first segment or an iconic representation linked to the first segment by an indicating line.

\* \* \* \* \*